US012187040B2

(12) United States Patent
Miyazawa

(10) Patent No.: US 12,187,040 B2
(45) Date of Patent: Jan. 7, 2025

(54) LIQUID EJECTING APPARATUS

(71) Applicant: SEIKO EPSON CORPORATION, Tokyo (JP)

(72) Inventor: Seiji Miyazawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/330,823

(22) Filed: Jun. 7, 2023

(65) Prior Publication Data

US 2023/0321989 A1 Oct. 12, 2023

Related U.S. Application Data

(63) Continuation of application No. 17/303,262, filed on May 25, 2021, now Pat. No. 11,701,889.

(30) Foreign Application Priority Data

May 27, 2020 (JP) ................................ 2020-092020

(51) Int. Cl.
*B41J 2/175* (2006.01)

(52) U.S. Cl.
CPC ................................ *B41J 2/17509* (2013.01)

(58) Field of Classification Search
None
See application file for complete search history.

(56) References Cited

U.S. PATENT DOCUMENTS

| | | | | |
|---|---|---|---|---|
| 10,160,220 | B2 | 12/2018 | Moriyama et al. | |
| 2018/0126744 | A1 | 5/2018 | Moriyama et al. | |
| 2018/0154641 | A1 | 6/2018 | Moriyama et al. | |
| 2020/0238713 | A1* | 7/2020 | Ishizawa | B41J 2/17523 |
| 2020/0238722 | A1* | 7/2020 | Ishizawa | B41J 29/13 |

FOREIGN PATENT DOCUMENTS

| | | | | |
|---|---|---|---|---|
| CN | 111976312 | | 11/2020 | |
| JP | 2018-069696 | A | 5/2018 | |
| JP | 2018-089852 | A | 6/2018 | |
| JP | 2019202464 | A * | 11/2019 | B41J 2/17503 |
| JP | 2020-001264 | A | 1/2020 | |
| JP | 2020-116826 | A | 8/2020 | |
| JP | 2020-116827 | A | 8/2020 | |

* cited by examiner

*Primary Examiner* — Justin Seo
(74) *Attorney, Agent, or Firm* — WORKMAN NYDEGGER

(57) ABSTRACT

A liquid ejecting apparatus includes a recording head that ejects ink, an ink tank that contains ink and that includes an inlet through which ink is poured from a refill container, an outer case that houses the recording head and the ink tank and that includes an upper case member disposed in the +Z direction and a side case member crossing the upper case member, and an opening and closing cover that is attached to the outer case and that is configured to rotate between an open position at which the ink can be poured from the refill container into the ink tank and a closed position at which the ink tank is covered. The side case member has a cutout.

7 Claims, 10 Drawing Sheets

LIQUID EJECTING APPARATUS

This application is a continuation of U.S. patent application Ser. No. 17/303,262, filed May 25, 2021, which is based on, and claims priority from JP Application Serial Number 2020-092020, filed May 27, 2020, the disclosures of which are hereby incorporated by reference herein in their entirety.

BACKGROUND

1. Technical Field

The present disclosure relates to liquid ejecting apparatuses.

2. Related Art

Disclosed examples include a liquid ejecting apparatus including a recording head that ejects ink to a print medium for printing and a liquid container that contains ink to be supplied to the recording head, in which the liquid container can be replenished with ink consumed by recording (for example, JP-A-2018-069696). A liquid ejecting apparatus disclosed in JP-A-2018-069696 includes a first opening and closing member (a scanner unit) disposed on the top of a liquid container (an ink tank), a second opening and closing member (an ink tank cover), and a third opening and closing member (an inlet cover). The ink tank is disposed inside a casing that constitutes the exterior of the apparatus main body. By opening and closing these opening and closing members, the ink tanks can be refilled with ink, inside the casing, from refill containers. Furthermore, the liquid ejecting apparatus disclosed in JP-A-2018-069696 is made compact by disposing at least one of the plurality of ink tanks inside the opening and closing area of the scanner unit so that the number of ink tanks disposed outside the opening and closing area of the scanner unit is decreased to decrease the area of ink tanks disposed outside the opening and closing area of the scanner unit.

However, in the liquid ejecting apparatus disclosed in JP-A-2018-069696, the ink tanks are refilled with ink, inside the casing, from the refill containers. This requires disposing the ink tanks somewhat away from the casing to prevent the refill containers from coming into contact with the ink tanks when refilling the ink tanks with ink. This makes it difficult to dispose the ink tanks close to the casing, leaving room for improvement in reducing the size of the apparatus.

SUMMARY

A liquid ejecting apparatus according to an aspect of the present disclosure includes a liquid ejecting unit that ejects liquid, a liquid container that contains the liquid and that includes an inlet through which the liquid is poured from the refill container, an outer case that houses the liquid ejecting unit and the liquid container and that includes an upper case member disposed vertically above and a side case member crossing the upper case member, and an opening and closing member that is attached to the outer case and that is configured to rotate between an open position at which the liquid can be poured from the refill container into the liquid container and a closed position at which the liquid container is covered, wherein the side case member has a cutout.

DESCRIPTION OF EXEMPLARY EMBODIMENTS

1. First Embodiment 1.1. Outline of Printing System

Figure 1:
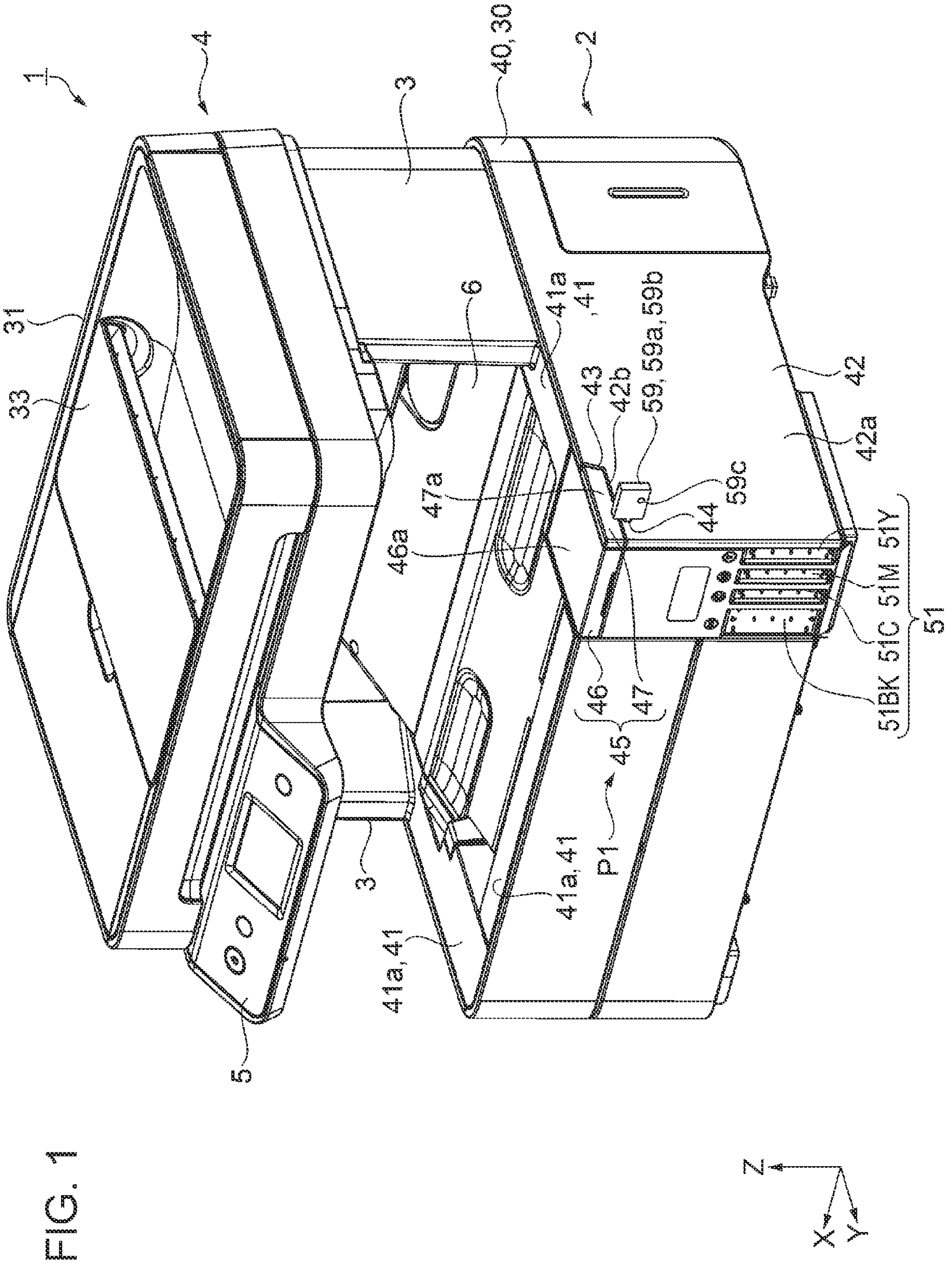
FIG. 1 is a perspective view of a printing system including a printer according to a first embodiment of the present disclosure.

Referring to FIG. 1, the overall configuration of a printing system 1 including a printer 2 according to a first embodiment will be described. As illustrated in FIG. 1, the printing system 1 is configured as a multifunctional device including the printer 2 configured to print on a print medium M and a scanner 4 configured to read an image formed on an original medium. The printer 2 has a substantially rectangular parallelepiped shape. The scanner 4 is disposed above the printer 2 and is supported by support portions 3 disposed at the opposite ends of the printer 2 in the longitudinal direction. The printer 2 includes a restricting member 59. In the following description, the longitudinal direction of the substantially rectangular parallelepiped printer 2 (the short side direction of the print medium M) is referred to as an X direction, the lateral direction of the printer 2 (the long side direction of the print medium M) is referred to as a Y direction, and the height direction of the printer 2 is referred to as a Z direction. The tip side of the arrow indicating the direction is referred to as +direction, and the base side of the arrow indicating the direction is referred to as −direction. The printer 2 is an example of the liquid ejecting apparatus in the application concerned. The +Z direction is an example of the vertically above in the present application. The +X direction is an example of a direction from the side case member to a third member in the present application.

An operating portion 5 is provided at the end of the scanner 4 in the +Y direction. The operating portion 5 includes a plurality of operation buttons and a display panel. In this embodiment, the operating portion 5 is configured to perform a recording operation in the printer 2 and an image reading operation in the scanner 4.

A medium receiving tray 6 is provided on the top of the printer 2. In this embodiment, the medium receiving tray 6 is configured to receive a print medium M discharged from the interior of the printer 2 in an inclined orientation (see FIG. 2). Specifically, the medium receiving tray 6 is configured to be inclined upward (+Z direction) in the −Y direction, which is a print medium M discharge direction.

Figure 2:
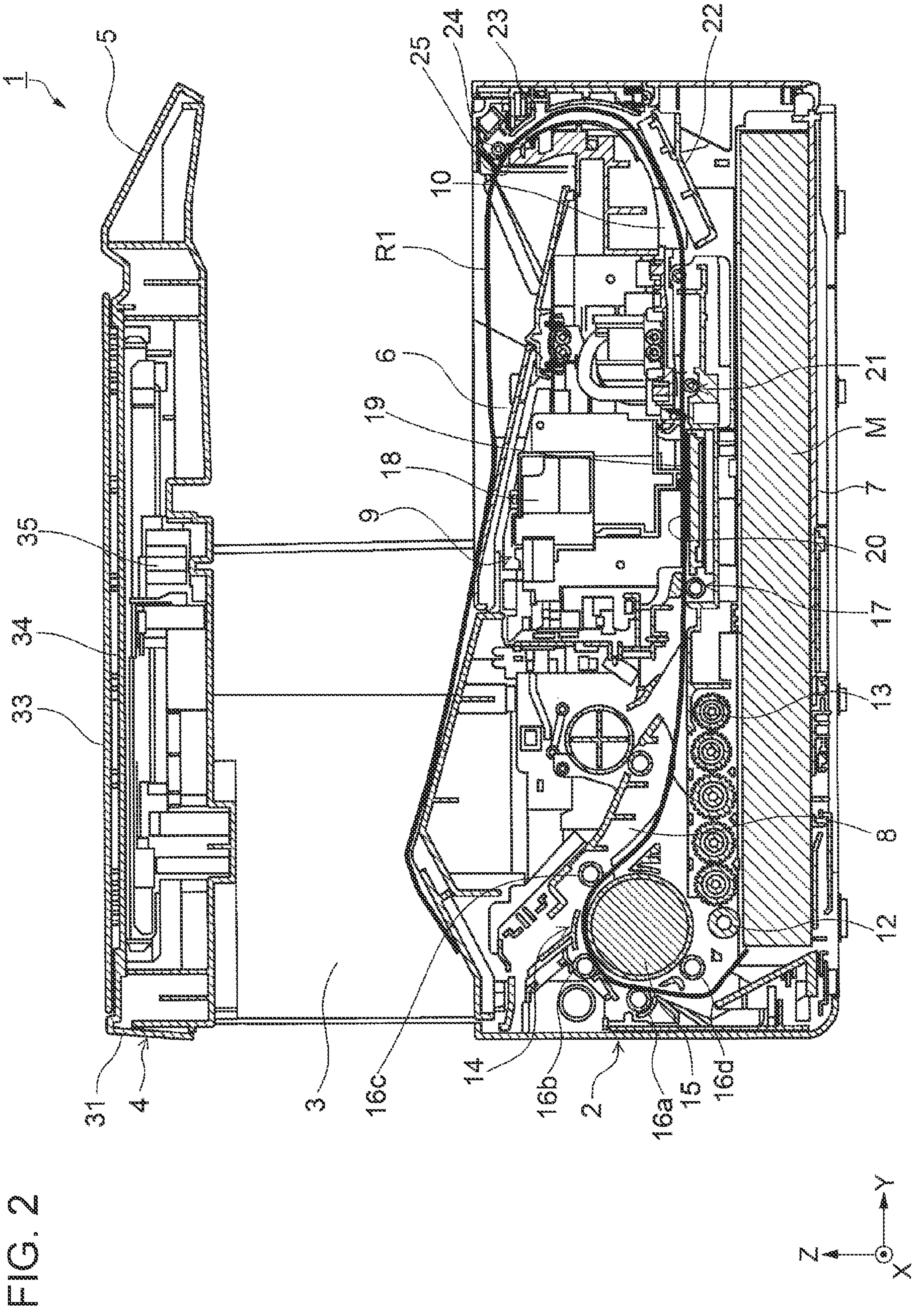
FIG. 2 is a cross-sectional view of the printing system including the printer according to the first embodiment.
Figure 3:
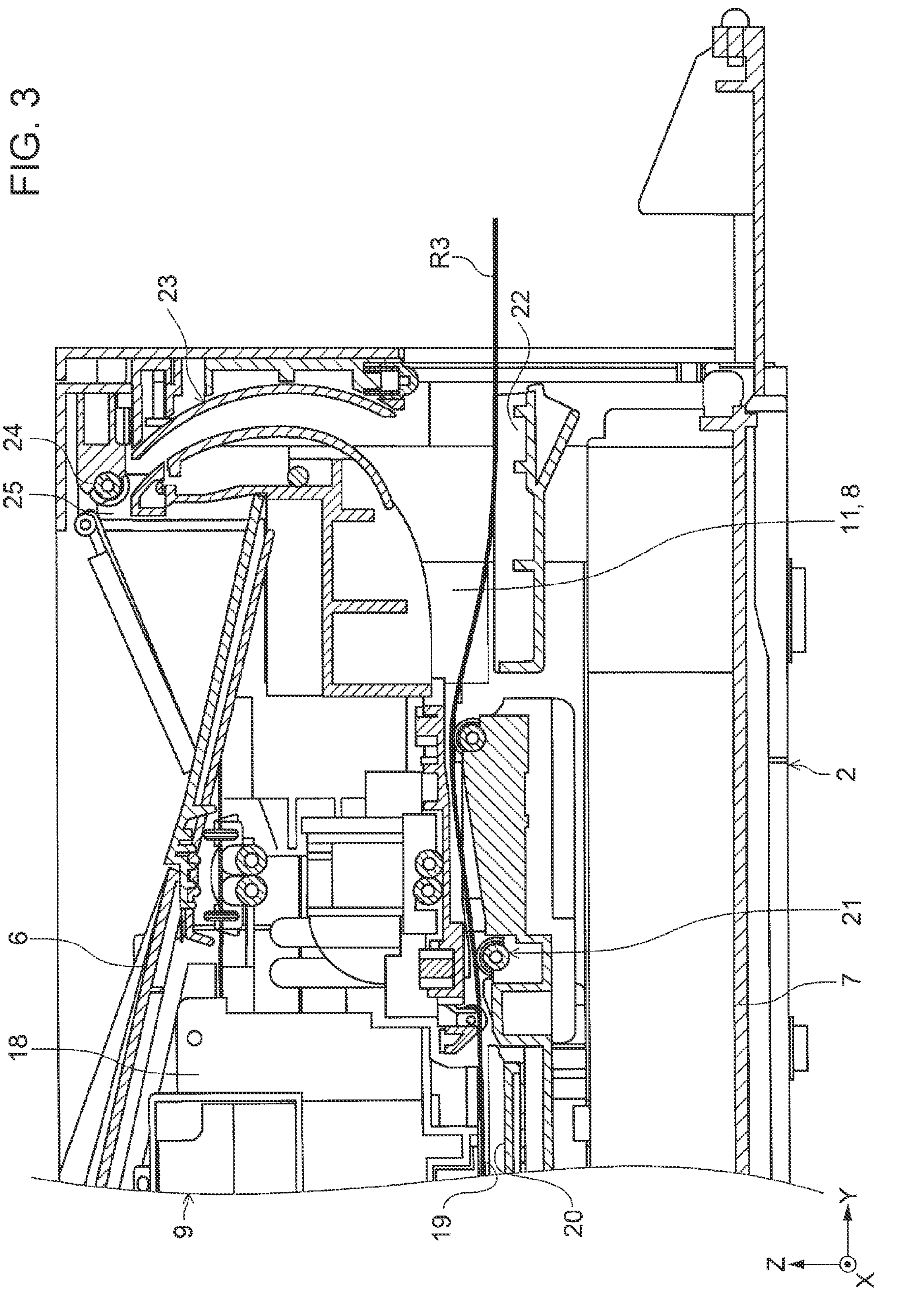
FIG. 3 is an enlarged cross-sectional view of the printer, illustrating a straight path.

In FIG. 2, the thick line indicated by sign R1 indicates the transport path of the print medium M transported along a medium transport path 8. In FIG. 3, the thick line indicated by sign R3 indicates the transport path of the print medium M transported along a straight path 11. As indicated by the thick line R1 in FIG. 2, the medium transport path 8 from the medium housing portion 7 to the medium receiving tray 6 has a curved reverse path 10 that is reversed in the +Z direction while curving from a recording portion 9 downstream in the transport direction. As indicated by the thick line R3 in FIG. 3, the medium transport path 8 from the medium housing portion 7 to the medium receiving tray 22 has the straight path 11 extending from the recording portion 9 to the front of the apparatus downstream in the transport direction.

As illustrated in FIG. 2, the printer 2 includes the medium housing portion 7 at the end in the −Z direction. In this embodiment, the long side of the print medium M with the maximum size of the medium housing portion 7 is set to the depth direction (Y direction) of the apparatus, and the short side of the print medium M with the maximum size is set to the width direction (X direction) of the apparatus.

A pickup roller 12 is provided on the medium housing portion 7 in the +Z direction. The pickup roller 12 is rotatable about a rotation shaft 13. The pickup roller 12 comes into contact with the print medium M housed in the medium housing portion 7 to transport the uppermost print medium M housed in the medium housing portion 7 downstream in the transport direction along the medium transport path 8.

A medium reversing portion 14 is provided downstream from the pickup roller 12 on the medium transport path 8. The medium reversing portion 14 includes a reversing roller 15 and driven rollers 16*a*, 16*b*, 16*c*, and 16*d* disposed around the reversing roller 15 and rotated following the reversing roller 15.

The print medium M fed by the pickup roller 12 is then fed to a transport roller pair 17 provided downstream in the transport direction through the medium reversing portion 14. The recording portion 9 is disposed downstream from the transport roller pair 17 in the transport direction. The recording portion 9 is provided with a carriage 18. The carriage 18 is configured to move in the +X direction and the −X direction, below which a recording head 19 that ejects ink in the −Z direction is mounted. The ink is an example of the liquid in this application. The recording head 19 is an example of the liquid ejecting unit in this application. The direction in which the carriage 18 moves is sometimes referred to as scanning direction X.

A medium support portion 20 is disposed at an area below and facing the recording head 19. The medium support portion 20 supports the lower surface of the print medium M transported to the area facing the recording head 19 by the transport roller pair 17. The recording head 19 ejects ink to the print medium M supported by the medium support portion 20 to record an image on the print medium M.

A discharge roller pair 21 is disposed downstream from the recording head 19 in the transport direction. A medium receiving tray 22 is disposed downstream from the discharge roller pair 21 in the transport direction. The medium receiving tray 22 can be switched between a guide orientation in which the print medium M is guided from the recording portion 9 to the curved reverse path 10 (see FIG. 2) and a medium receiving orientation in which the print medium M discharged by the discharge roller pair 21 (see FIG. 3). When the medium receiving tray 22 is in the guide orientation, the curved reverse path 10 that reverses while curving from the recording portion 9 in the +Z direction downstream in the transport direction is formed (see FIG. 2). When the medium receiving tray 22 is in the medium receiving orientation, the straight path 11 that extends from the recording portion 9 downstream in the transport direction toward the front of the apparatus is formed (see FIG. 3).

In FIG. 2, a curved reverse path formed portion 23 is provided downstream from the medium receiving tray 22 in the guide orientation, specifically, in the +Z direction. The curved reverse path formed portion 23 constitutes the curved reverse path 10 that curves and reverses the print medium M.

The print medium M transported from the recording portion 9 downstream by the discharge roller pair 21 is guided to the curved reverse path formed portion 23 by the medium receiving tray 22 in the guide orientation. The curved reverse path formed portion 23 curves and reverses the print medium M, with the printed surface on which printing was performed by the recording portion 9 inside, and discharges the print medium M through an outlet 25 toward the medium receiving tray 6 via a discharge roller 24 provided downstream from the curved reverse path formed portion 23. At that time, the print medium M is discharged onto the medium receiving tray 6, with the surface printed at the recording portion 9 down.

The scanner 4 includes a scanner casing 31, a cover 33, a platen 34, and a scanning unit 35. The cover 33 is rotatably mounted to the scanner casing 31. The cover 33 is configured to cover the platen 34 in its closed state and to expose the platen 34 in its open state. The scanning unit 35 can scan an image on an original medium placed on the platen 34.

1.2. Outline of Printer

Figure 4:
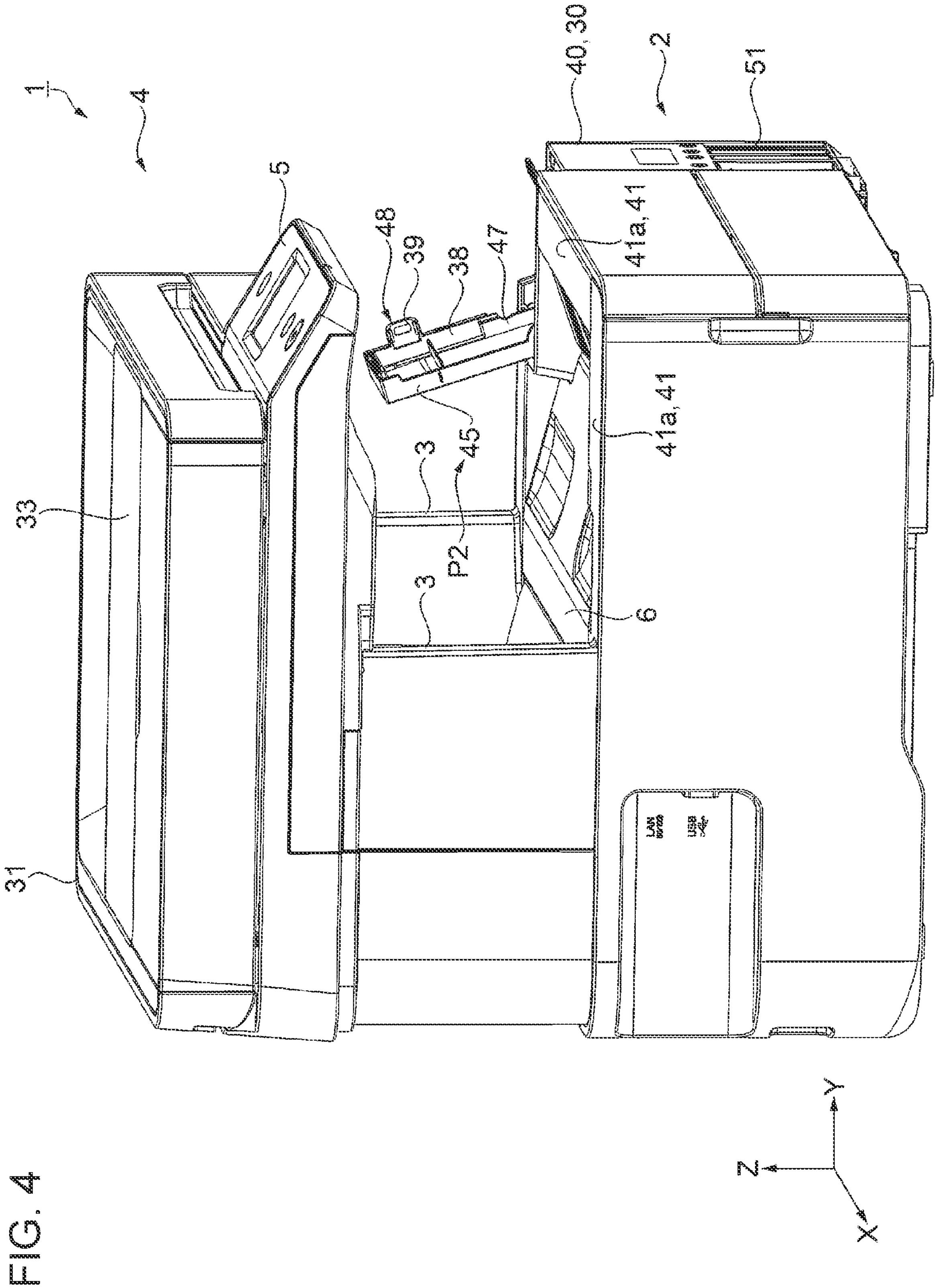
FIG. 4 is another perspective view of the printing system including the printer according to the first embodiment.
Figure 5:
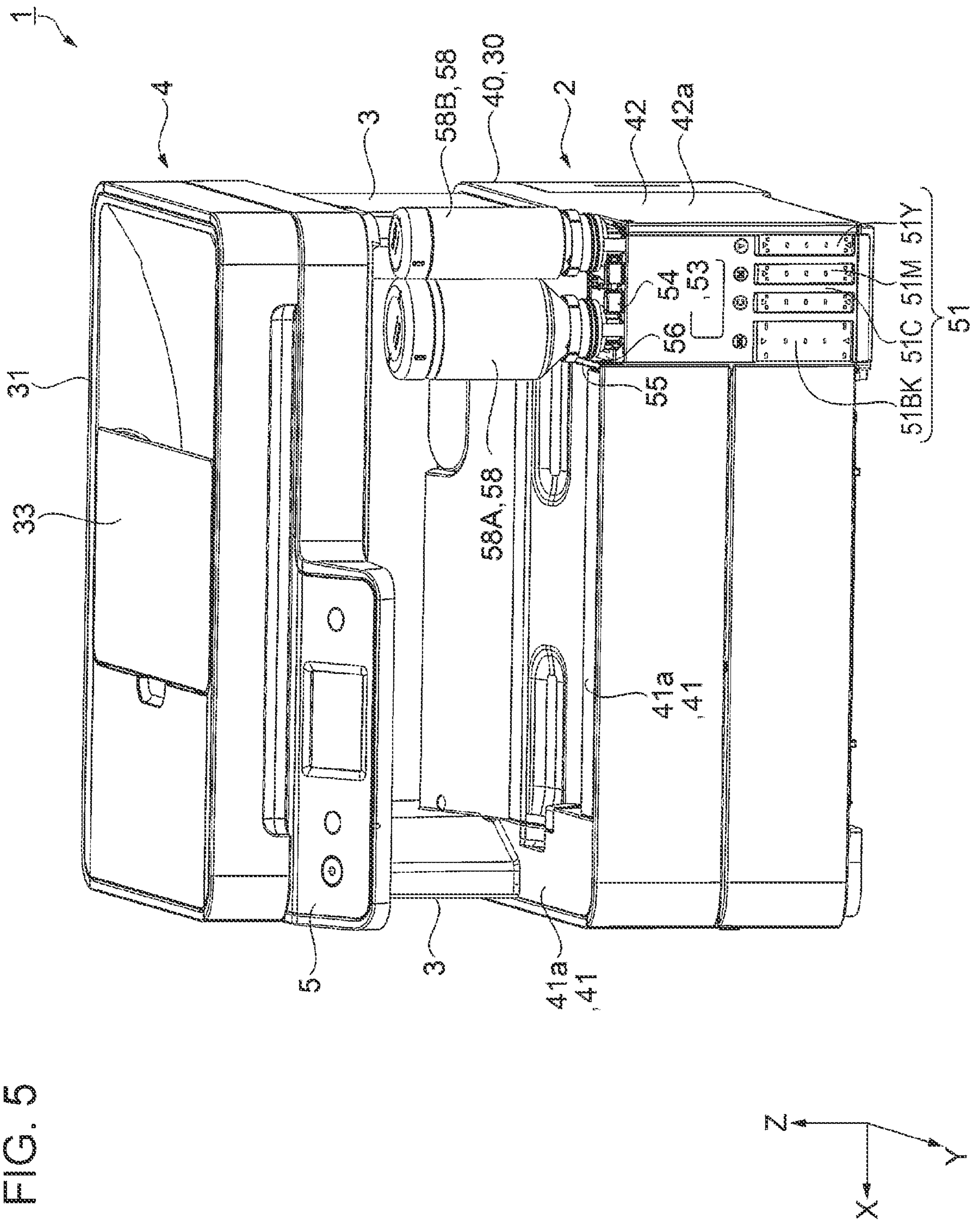
FIG. 5 is another perspective view of the printing system including the printer according to the first embodiment.
Figure 6:
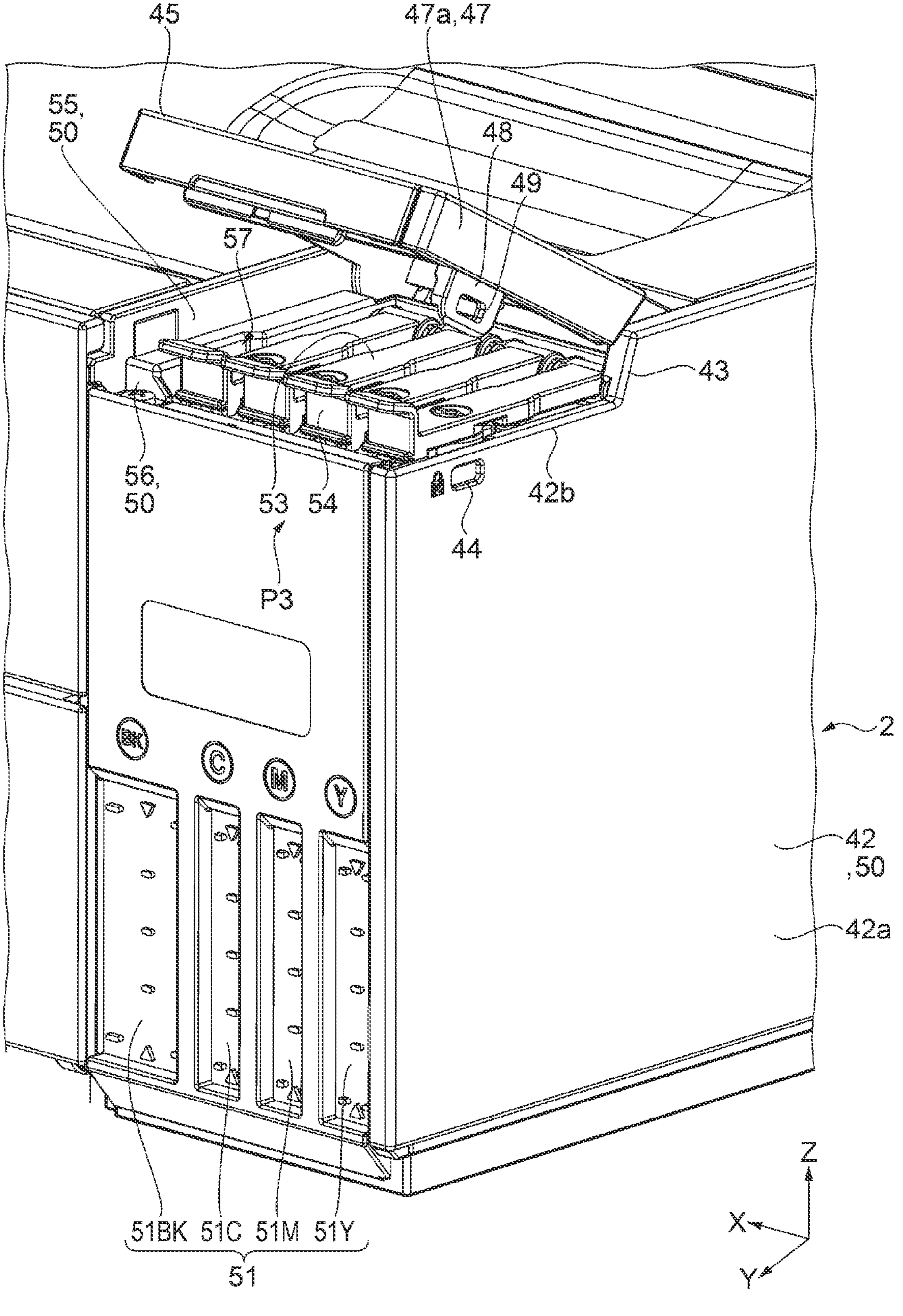
FIG. 6 is an enlarged perspective view of a portion where refill containers and ink tanks are coupled.
Figure 7:
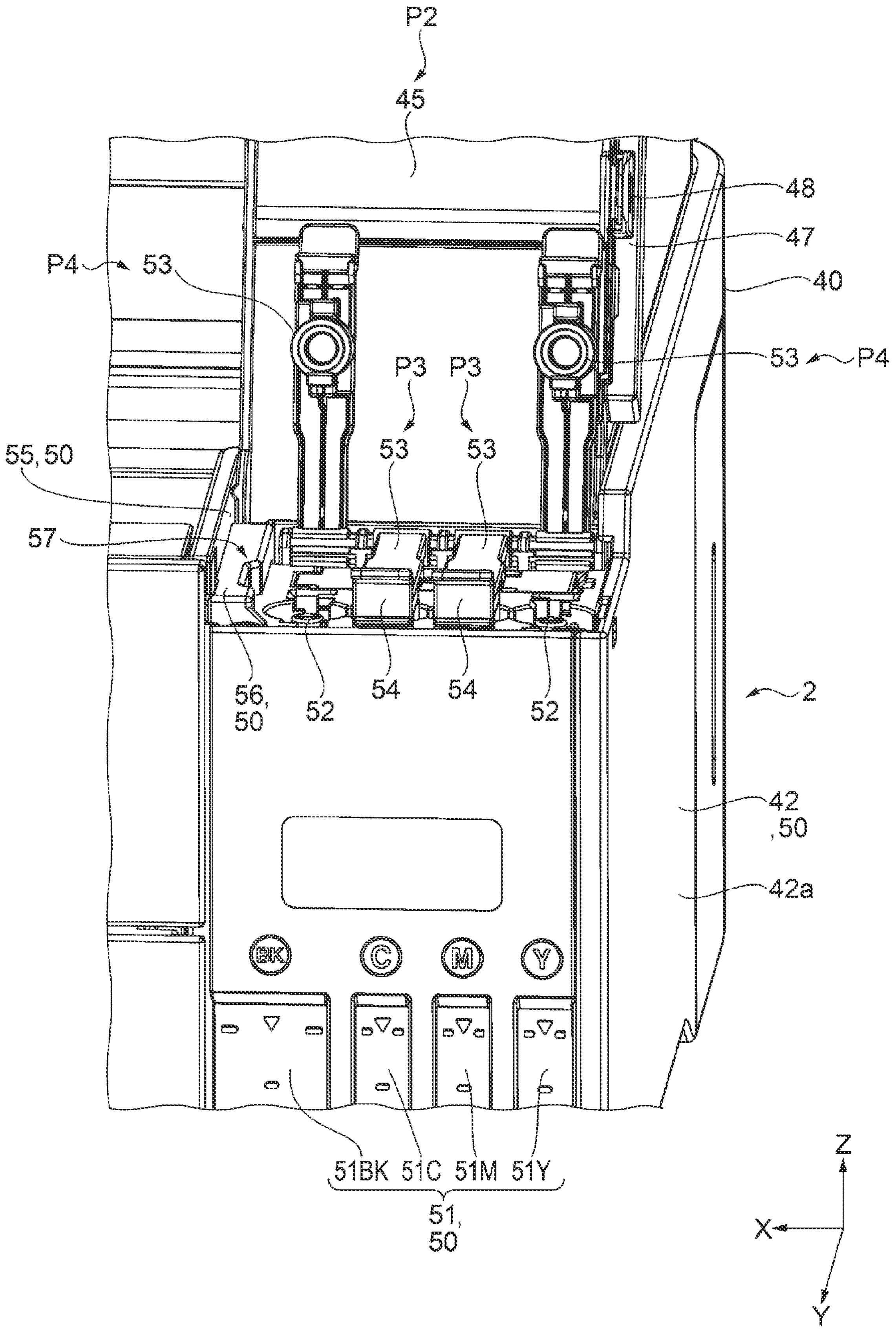
FIG. 7 is another enlarged perspective view of the portion where the refill containers and the ink tanks are coupled.
Figure 8:
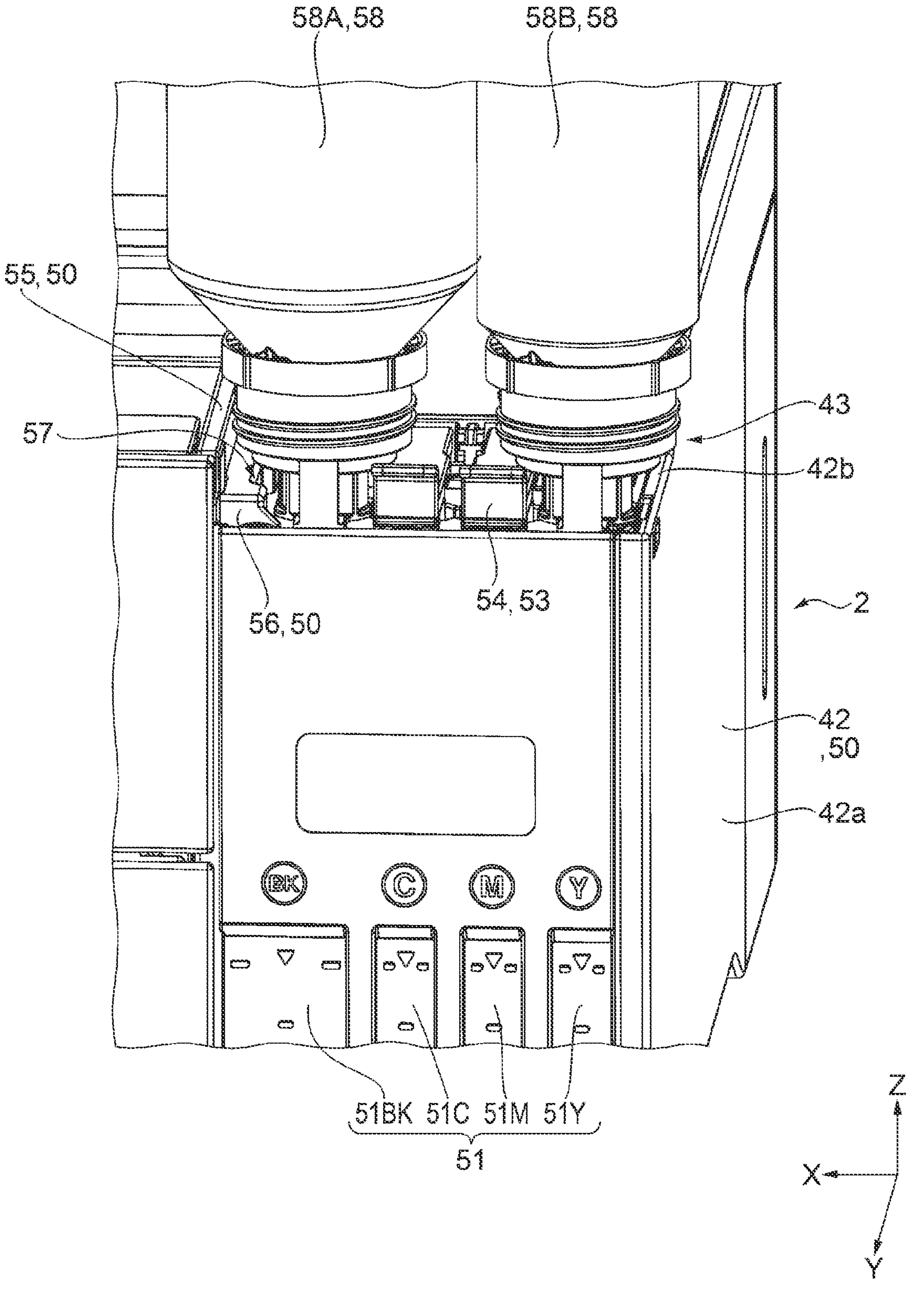
FIG. 8 is another enlarged perspective view of the portion where the refill containers and the ink tanks are coupled.

FIG. 1 is a perspective view of the printing system 1, when the opening and closing cover 45 is disposed at a closed position P1, illustrating a state in which the opening and closing cover 45 is fixed to the side case member 42 with the restricting member 59. FIG. 4 is another perspective view of the printing system 1 viewed at the opposite side from FIG. 1, illustrating a state in which the opening and closing cover 45 is disposed at an open position P2. FIG. 5 is another perspective view of the printing system 1, illustrating a state in which ink is poured from refill containers 58 into ink tanks 51. FIG. 6 is an enlarged perspective view of a portion where the refill containers 58 and the ink tanks 51 are coupled, illustrating caps 53 in a closed position P3. FIG. 7 is another enlarged perspective view of the portion where the refill containers 58 and the ink tanks 51 are coupled, illustrating caps 53 in the closed position P3 and cap 53 in the open position P4. FIG. 8 is another enlarged perspective view of the portion where the refill containers 58 and the ink tanks 51 are coupled, illustrating a state in which ink is poured from the refill containers 58 into the ink tanks 51. In FIGS. 4 to 8, the opening and closing cover 45 is not fixed to the side case member 42 with the restricting member 59.

Referring next to FIG. 1 and FIGS. 4 to 8, the printer 2 according to this embodiment will be described in more detail. As illustrated in FIG. 1, the printer 2 according to this embodiment includes a printer casing 30 that houses the medium housing portion 7 in which the print media M are stored (see FIG. 2), components for transporting the print media M, a component (recording head 19) for recording an image on the print media M, and components that contain ink (ink tanks 51). The printer casing 30 includes an outer case 40 constituting the exterior of the printer 2. The outer case 40 includes a housing case 50 (see FIG. 7) in which the ink tanks 51 are housed. In other words, the recording head 19 and the ink tanks 51 are housed in the outer case 40.

The outer case 40 houses the recording head 19 and the ink tanks 51 and includes upper case members 41 disposed in the +Z direction (vertically above) and a side case member 42 crossing the upper case member 41 and disposed in the −X direction. The surface of each upper case member 41 in the +Z direction is a surface 41*a* of the upper case member 41, and the surface of the side case member 42 in the −X direction is a surface 42*a* of the side case member 42. The upper case members 41 are disposed around the medium receiving tray 6. Specifically, the upper case members 41 are disposed in the +X direction, in the −X direction, in the +Y direction, and in the −Y direction with respect to the medium receiving tray 6.

The printer 2 includes four ink tanks 51 at the right corner of the printer 2 in front view. The ink tanks 51 are disposed in the printer casing 30 (the outer case 40) and outside the carriage 18. In other words, the printer 2 according to this embodiment is a so-called off-carriage printer in which the ink tanks 51 are disposed outside the carriage 18.

The four ink tanks 51 include an ink tank 51BK containing black ink, an ink tank 51C containing cyan ink, an ink tank 51M containing magenta ink, and an ink tank 51Y containing yellow ink. The ink tank 51Y, the ink tank 51M, the ink tank 51C, and the ink tank 51BK are disposed in order in the +X direction, and the ink tank 51Y is disposed near the side case member 42. The ink tanks 51 are an example of the liquid container in this application.

The inks of four colors contained in the four ink tanks 51 are used in recording full color images, such as pictures and illustrations. The black ink contained in the ink tank 51BK is used in recording black and white images, such as characters and markers. Since the black ink is used more than the other inks, the ink tank 51BK is configured to contain a larger amount of ink than the other ink tanks 51C, 51M, and 51Y.

As illustrated in FIG. 5, a refill container 58A for pouring black ink into the ink tank 51BK has a larger capacity than a refill container 58B for pouring the other inks into the respective other ink tanks 51C, 51M, and 51Y. The refill containers 58 for pouring ink into the ink tanks 51 include a refill container 58A with a large capacity containing black ink and refill containers 58B with a small capacity containing the other inks (cyan ink, magenta ink, and yellow ink).

Referring back to FIG. 1, the opening and closing cover 45, which is an example of the opening and closing member in this application, is disposed above the ink tanks 51. The opening and closing cover 45 is mounted to the upper case member 41 and is rotatable about the end in the −Y direction. Specifically, the opening and closing cover 45 is mounted to the upper case member 41 (the outer case 40) and is rotatable between the open position P2 (see FIG. 4) at which ink can be poured from the refill containers 58 into the ink tanks 51 and the closed position P1 at which the opening and closing cover 45 covers the ink tanks 51. The open position P2 is an example of the open position at which ink can be poured to the liquid container in this application, and the closed position P1 is an example of the closed position at which the liquid container is covered in this application.

The opening and closing cover 45 includes a first member 46 disposed in the +Z direction (vertically above) at the closed position P1 and a second member 47 crossing the first member 46. At the closed position P1, the surface of the first member 46 in the +Z direction is a surface 46*a* of the first member 46, and the surface of the second member 47 in the −X direction is a surface 47*a* of the second member 47. The surface 46*a* of the first member 46 is an example of the surface of the opening and closing member in this application and an example of the surface of the first member in this application. The surface 47*a* of the second member 47 is an example of the surface of the second member in this application.

In the printer 2, the surface 46*a* of the first member 46 is flush with the surface 41*a* of the upper case member 41 at the closed position P1. Specifically, the position of the surface 46*a* of the first member 46 in the Z direction and the position of the surface 41*a* of the upper case member 41 in the Z direction are the same, and the surface 46*a* of the first member 46 and the surface 41*a* of the upper case member 41 are disposed in the same plane (X-Y plane). This configuration forms no unnecessary protrusions and depressions on the printer 2 in the +Z direction, decreasing the dimension of the printer 2 in the Z direction to decrease the height of the printer 2 as compared with a case in which the printer 2 has unnecessary protrusions and depressions in the +Z direction, thereby making the printer 2 compact.

Furthermore, the surface 47*a* of the second member 47 is flush with the surface 42*a* of the side case member 42. Specifically, the position of the surface 47*a* of the second member 47 in the X direction and the position of the surface 42*a* of the side case member 42 in the X direction are the same, and the surface 47*a* of the second member 47 and the surface 42*a* of the side case member 42 are disposed in the same plane (Y-Z plane). This configuration does not form unnecessary protrusions and depressions on the printer 2 in the −x direction, decreasing the dimension of the printer 2 in the x direction to reduce the width of the printer 2 as compared with a case in which the printer 2 has unnecessary protrusions and depressions in the −x direction, thereby making the printer 2 compact.

For example, even if the surfaces of two members are not disposed in the same plane to form a level difference between the surfaces of the two members, if the level difference is small, the two members are regarded as being flush with each other. For example, even if the surfaces of two members have inclination or unevenness, if the inclination or unevenness is slight, the two members are regarded as being flush with each other. In other words, when the surfaces of two members are regarded as being substantially disposed in the same plane, the two members are regarded as being flush with each other.

In the printer 2 according to this embodiment, the color of the surface 46*a* of the first member 46 and the color of the surface 41*a* of the upper case member 41 are the same, and the color of the surface 47*a* of the second member 47 and the color of the surface 42*a* of the side case member 42 are the same. For example, when the color of the surface 46*a* of the first member 46 and the color of the surface 41*a* of the upper case member 41 are black, and the color of the surface 47*a* of the second member 47 and the color of the surface 42*a* of the side case member 42 are white, the printer 2 is of a sophisticated design based on white and black. In addition, disposing the surface 46*a* of the first member 46 and the surface 41*a* of the upper case member 41 in the same plane, and disposing the surface 47*a* of the second member 47 and the surface 42*a* of the side case member 42 in the same plane to reduce unnecessary unevenness allows the printer 2 to have a sophisticated shape (design) while reducing the size of the printer 2.

As illustrated in FIG. 6, the end (side) of the side case member 42 in the +Z direction is recessed in the −Z direction near the ink tank 51Y. The end (side) of the side case member 42 recessed in the −Z direction near the ink tank 51Y is a side 42*b*. A space in the +Z direction with respect to the side 42*b* of the side case member 42 recessed in the −Z direction near the ink tank 51Y is a cutout 43. In other words, the portion of the side 42*b* of the side case member 42 is a portion of the side case member 42 in which the cutout 43 is provided. Thus, the side case member 42 has the cutout 43 near the ink tank 51Y.

As shown in FIG. 1, when the opening and closing cover 45 is disposed at the closed position P1 at which the ink tank 51 is covered, the second member 47 of the opening and closing cover 45 is disposed in the cutout 43. For example, if the opening and closing cover 45 is disposed at the closed position P1, and the opening and closing cover 45 does not include the second member 47, a member (for example, the ink tank 51) disposed in the outer case 40 is visible, and foreign substances easily enters the outer case 40 through the cutout 43 of the side case member 42. In this embodiment, when the opening and closing cover 45 is disposed at the closed position P1, the cutout 43 of the side case member 42 is closed by the second member 47 of the opening and closing cover 45, reducing the possibility that foreign substances enter the outer case 40.

As illustrated in FIGS. 6 and 7, in addition to the main body containing ink, each ink tank 51 includes the cap 53 and an inlet 52 through which ink is poured from the refill container 58. The cap 53 can be switched between the open position P4 at which the inlet 52 is opened and the closed position P3 at which the inlet 52 is closed, with the end in the −Y direction as its rotation axis. When the cap 53 is disposed at the closed position P3, the cap 53 seals the inlet 52 to prevent the ink contained in the ink tank 51 from being dried. The cap 53 is an example of the second opening and closing member in this application. The open position P4 is an example of the open position at which the inlet is opened in this application. The closed position P3 is an example of the closed position at which the inlet is sealed in this application.

The end of the cap 53 in the +Y direction is provided with a tab 54 protruding in the +Z direction. When the cap 53 is disposed at the closed position P3 at which the inlet 52 is sealed, the tab 54 protrudes in the +Z direction from the side 42*b* of the side case member 42 (the portion of the side case member 42 in which the cutout 43 is provided) in plan view seen from the side case member 42, that is, from the −X direction. The end of the cap 53 in the +Y direction is an example of one end in this application.

The user rotates the cap 53 using the tab 54 to dispose the cap 53 at the open position P4 at which the inlet 52 is opened, and then pours ink from the refill container 58 into the ink tank 51. After the pouring of ink into the ink tank 51 ends, the user rotates the cap 53 using the tab 54 to dispose the cap 53 to the closed position P3 at which the inlet 52 is sealed. The protrusion of the tab 54 from the side 42*b* of the side case member 42 in the +Z direction allows the user to easily hold the cap 53 as compared with a case in which the tab 54 is disposed in the −Z direction with respect to the side 42*b* of the side case member 42, making it easy for the user to pour ink from the refill container 58 into the ink tank 51.

As illustrated in FIG. 6, the side case member 42 includes an opening 44 in which the restricting member 59 is inserted. At the end of the second member 47 adjacent to the ink tank 51, a protrusion 48 protruding toward the ink tank 51 is provided. The protrusion 48 is also a component of the opening and closing cover 45. When the opening and closing cover 45 is disposed at the closed position P1, the second member 47 is disposed in the cutout 43 of the side case member 42, and the protrusion 48 disposed at the second member 47 is disposed on the +X side with respect to the side case member 42. In other words, when the opening and closing cover 45 is disposed at the closed position P1, the second member 47 is disposed so as to seal the cutout 43, and the protrusion 48 provided at the second member 47 overlaps with the side case member 42 in plan view seen from the side case member 42.

At a portion at which the protrusion 48 and the side case member 42 overlap in plan view seen from the side case member 42 when the opening and closing cover 45 is disposed at the closed position P1, the protrusion 48 has an oblong opening 49, and the side case member 42 has an oblong opening 44. When the opening and closing cover 45 is disposed at the closed position P1, the opening 49 of the protrusion 48 and the opening 44 of the side case member 42 have the same shape and overlap in plan view seen from the side case member 42.

As illustrated in FIG. 4, a reinforcing member 38 is joined to the opposite side of the second member 47 from the side case member 42. In other words, the opening and closing cover 45 includes the reinforcing member 38 joined to the opposite side of the second member 47 from the side case member 42. When the opening and closing cover 45 is disposed at the closed position P1, the reinforcing member 38 overlaps with the protrusion 48 in plan view seen from the side case member 42. The reinforcing member 38 has an opening 39 with the same shape as the shape of the opening 49 of the protrusion 48. When the opening and closing cover 45 is disposed at the closed position P1, the opening 39 of the reinforcing member 38 overlaps with the opening 49 of the protrusion 48 and the opening 44 of the side case member 42 in plan view seen from the side case member 42.

The first member 46, the second member 47, and the protrusion 48, which are components of the opening and closing cover 45, are made of resin. The reinforcing member 38 is sheet metal. The constituent material of the reinforcing member 38 is metal (for example, iron). The reinforcing member 38 therefore has higher mechanical strength than the second member 47 and the protrusion 48. For this reason, when the reinforcing member 38 is joined to the opposite side of the second member 47 from the side case member 42, the reinforcing member 38 increases the mechanical strength of the second member 47 and the protrusion 48, enhancing the mechanical strength of the opening and closing cover 45. Thus, the opening and closing cover 45 includes the reinforcing member 38 that increases the mechanical strength of the opening and closing cover 45.

As shown in FIG. 1, when ink is not to be poured from the refill containers 58 into the ink tanks 51, the restricting member 59 is attached to the side case member 42 into the opening 39 of the reinforcing member 38 (not shown in FIG. 1) in addition to the opening 44 of the side case member 42 and the opening 49 of the protrusion 48 of the second member 47 (not shown in FIG. 1). In other words, the restricting member 59 is inserted into the reinforcing member 38 in addition to the second member 47 and the side case member 42. As shown in FIG. 6, when ink is to be poured from the refill containers 58 into the ink tanks 51, the restricting member 59 is removed from the side case member 42. Thus, when the restricting member 59 is attached to the side case member 42, the opening and closing cover 45 is locked to the side case member 42 by the restricting member 59, making it impossible to put the opening and closing cover 45 at the open position P2. When the restricting member 59 is detached from the side case member 42, the locking of the opening and closing cover 45 to the side case member 42 is released, making it possible to put the opening and closing cover 45 at the open position P2. Furthermore, since the restricting member 59 is inserted into the reinforcing member 38 in addition to the second member 47 and the side case member 42, the mechanical strength of the opening and closing cover 45 is increased by the reinforcing member 38. This prevents the opening and closing cover 45 from being broken even if a large force is exerted on the restricting member 59, and the locking of the opening and closing cover 45 to the side case member 42 with the restricting member 59 is maintained with stability.

An example of the restricting member 59 is Kensington Lock®. The restricting member 59 includes a first restricting member 59*a* having a laterally long end that can pass through the openings 39, 44, and 49 and a second restricting member 59*b* having an and that can be inserted into the openings 39, 44, and 49 (see FIG. 1). When the opening and closing cover 45 is disposed at the closed position P1, the longitudinal end of the first restricting member 59*a* is passed through the openings 39, 44, and 49 to attach the first restricting member 59*a* to the second member 47 and the opening and closing cover 45. When the first restricting member 59*a* is then rotated, the opening and closing cover 45 is locked to the side case member 42 by the first restricting member 59*a* at the closed position P1. Next, the end of the second restricting member 59*b* is inserted into the openings 39, 44, and 49 to attach the second restricting member 59*b* to the second member 47 and the side case member 42. This makes it impossible to rotate the first restricting member 59*a* to pull out the first restricting member 59*a* from the second member 47 and the side case member 42.

Lastly, a padlock (not shown) is attached to the keyhole 59*c* of the restricting member 59 to lock the first restricting member 59*a* and the second restricting member 59*b* with the padlock. This makes it impossible to release the lock of the opening and closing cover 45 to the side case member 42, causing the opening and closing cover 45 to be locked at the closed position P1. When the padlock is detached from the restricting member 59, the second restricting member 59*b* is pulled out from the second member 47 and the side case member 42, and the first restricting member 59*a* is pulled out from the second member 47 and the side case member 42, the lock of the opening and closing cover 45 to the side case member 42 is released, and the lock of the opening and closing cover 45 to the closed position P1 is released, allowing the opening and closing cover 45 to be shifted from the closed position P1 to the open position P2. Thus, the printer 2 according to this embodiment includes the restricting member 59 that is inserted into the second member 47 and the side case member 42 to restrict the opening and closing of the opening and closing cover 45.

When ink is ejected from the recording head 19 to record an image on the print medium M, and the ink contained in the ink tank 51 is consumed, so that the amount of ink remaining in the ink tank 51 is decreased, the user detaches the padlock from the restricting member 59 to release the lock of the opening and closing cover 45 to the side case member 42 into the open position P2 and pours ink from the refill container 58 into the ink tank 51. After the pouring of the ink into the ink tank 51 ends, the user disposes the opening and closing cover 45 at the closed position P1, locks the opening and closing cover 45 to the side case member 42 with the restricting member 59, attaches the padlock to the restricting member 59, and manages the padlock so that the lock of the opening and closing cover 45 to the side case member 42 is not released by another user.

This configuration allows only a specific user who manages the padlock to release the lock of the opening and closing cover 45 to the side case member 42 to pour ink from the refill container 58 into the ink tank 51 and prevents another user from pouring ink from the refill container 58 into the ink tank 51.

The printer 2 uses two kinds of ink (inks of four colors), as described above. If an inexperienced user who is unfamiliar with ink pouring work performs ink pouring work, work mistakes such as pouring inappropriate ink into the ink tank 51 are likely to occur. For example, the work mistake of pouring yellow ink into the ink tank 51C for cyan ink is likely to occur. A mistake in the ink pouring work can cause the problem of deteriorating an image formed on the print medium M and the problem of clogging the ink channel from the ink tank 51 to the recording head 19. A mistake in the ink pouring work can be reduced, and a problem caused by the work mistake can be reduced by only a specific user who is familiar with the ink pouring operation performing the ink pouring work.

FIGS. 5 to 8 illustrate a case in which yellow ink is poured from the refill container 58B into the ink tank 51Y, and black ink is poured from the refill container 58A into the ink tank 51BK. FIG. 8 illustrates a portion where the refill containers 58 and the ink tanks 51 in FIG. 5 are coupled in an enlarged view to clearly illustrate a state in which the refill container 58B and the ink tank 51Y are coupled and a state in which the refill container 58A and the ink tank 51BK are coupled.

When inks (yellow ink and black ink) are to be poured from the refill containers 58A and 58B into the ink tanks 51Y and 51BK, respectively, the caps 53 are switched from the closed position P3 to the open position P4 to open the inlets 52 of the ink tanks 51Y and 51BK to make it possible to pour corresponding inks from the refill containers 58A and 58B into the ink tanks 51Y and 51BK, as shown in FIG. 7. Next, as shown in FIGS. 5 and 8, the refill containers 58A and 58B containing corresponding inks are attached to the ink tanks 51Y and 51BK, and the corresponding inks are poured from the refill containers 58A and 58B into the ink tanks 51Y and 51BK, respectively.

As shown in FIGS. 7 and 8, the printer 2 according to this embodiment includes a wall member 55 and a beam member 56 positioned on the opposite side of the ink tanks 51 from the side case member 42, that is, in the +X direction with respect to the ink tanks 51. The wall member 55 and the beam member 56 are opposed to the cutout 43 of the side case member 42. The wall member 55 is disposed in the +X direction with respect to the ink tank 51BK. The four ink tanks 51 are housed between the wall member 55 and the side case member 42. The wall member 55 and the side case member 42 constitute part of the housing case 50 in which the ink tanks 51 are housed. The beam member 56 is disposed in the +Z direction with respect to the ink tank 51BK. The beam member 56 is long in the Y direction. The beam member 56 constitutes part of the housing case 50 in which the ink tanks 51 are housed and enhances the mechanical strength of the housing case 50. The beam member 56 is an example of the third member of this application.

When black ink is to be poured from the refill container 58A into the ink tank 51BK, the refill container 58A and the ink tank 51BK are coupled to each other, with an end of the refill container 58A inserted in the inlet 52 of the ink tank 51BK. The beam member 56 is disposed near a portion where the refill container 58A and the ink tank 51BK are coupled and is recessed in the direction from the side case member 42 toward the beam member 56 (+X direction) at the position where the refill container 58A and the ink tank 51BK are coupled. In other words, the beam member 56 has a recessed portion 57 recessed in the +X direction at the portion where the refill container 58A and the ink tank 51BK are coupled. Providing the recessed portion 57 recessed in the +X direction at the portion where the refill container 58A and the ink tank 51BK are coupled allows the ink tank 51BK to be disposed nearer to the beam member 56 than a case in which the recessed portion 57 recessed in the +X direction is not provided, thus decreasing the interval between the ink tank 51BK and the beam member 56 (the dimension in the X direction). This decreases the dimension of the printer 2 in the X direction, thereby making the printer 2 compact. Furthermore, in addition to the beam member 56, the wall member 55 is also disposed near the ink tank 51 to decrease the interval between the ink tank 51 and the wall member 55 (the dimension in the X direction), thereby reducing the size of the printer 2.

When the yellow ink is to be poured from the refill container 58B into the ink tank 51Y, the refill container 58B and the ink tank 51Y are coupled, with an end of the refill container 58B inserted in the inlet 52 of the ink tank 51Y. In this embodiment, the side case member 42 has the cutout 43. Therefore, even if the ink tank 51Y is disposed near the side case member 42, the refill container 58B does not contact the side case member 42 in a state in which the refill container 58B and the ink tank 51Y are coupled, allowing the refill container 58B and the ink tank 51Y to be properly coupled.

If the ink tank 51Y is disposed near the side case member 42 without the cutout 43, the refill container 58B comes into contact with the side case member 42, with the refill container 58B and the ink tank 51Y coupled, making it impossible to properly couple the refill container 58B and the ink tank 51Y. This causes, when yellow ink is poured into the ink tank 51Y from the refill container 58B, a problem in which the yellow ink spills out of the ink tank 51Y. For this reason, the configuration in which the side case member 42 does not have the cutout 43, the distance between the refill container 58B and the inlet 52 of the ink tank 51Y needs to be long to prevent the interference between the refill container 58B and the side case member 42 in the X direction of the printer 2. In this embodiment, providing the side case member 42 withe cutout 43 allows the refill container 58B and the ink tank 51Y to be properly coupled even if the distance between the refill container 58B and the inlet 52 of the ink tank 51Y is decreased. This allows yellow ink to be properly poured into the ink tank 51Y, preventing a problem in which the yellow ink spills out of the ink tank 51Y.

Furthermore, in this embodiment, part of the refill container 58B is disposed outside the side case member 42 through the cutout 43 of the side case member 42, with the refill container 58B and the ink tank 51Y coupled. In other words, when yellow ink is to be poured into the ink tank 51Y from the refill container 58B, part of the refill container 58B is disposed outside the side case member 42 through the cutout 43. In pouring yellow ink from the refill container 58B into the ink tank 51Y, the disposition of part of the refill container 58B outside the side case member 42 through the cutout 43 allows the ink tank 51Y to be disposed near the side case member 42 as compared with a case in which the refill container 58B is disposed inside the side case member 42. This decreases the interval between the ink tank 51Y and the side case member 42 (the dimension in the X direction) to decrease the dimension of the printer 2 in the X direction, reducing the size of the printer 2.

Thus, the printer 2 according to this embodiment is configured such that the side case member 42 has the cutout 43. This allows the refill container 58 and the ink tank 51 to be properly coupled even if the ink tank 51 is disposed near the side case member 42, allowing ink to be properly poured from the refill container 58 into the ink tank 51. In addition, disposing part of the refill container 58 outside the side case member 42 through the cutout 43 allows the ink tank 51 to be disposed near the side case member 42, decreasing the dimension of the printer 2 in the X direction, thereby reducing the size of the printer 2.

2. Second Embodiment

Figure 9:
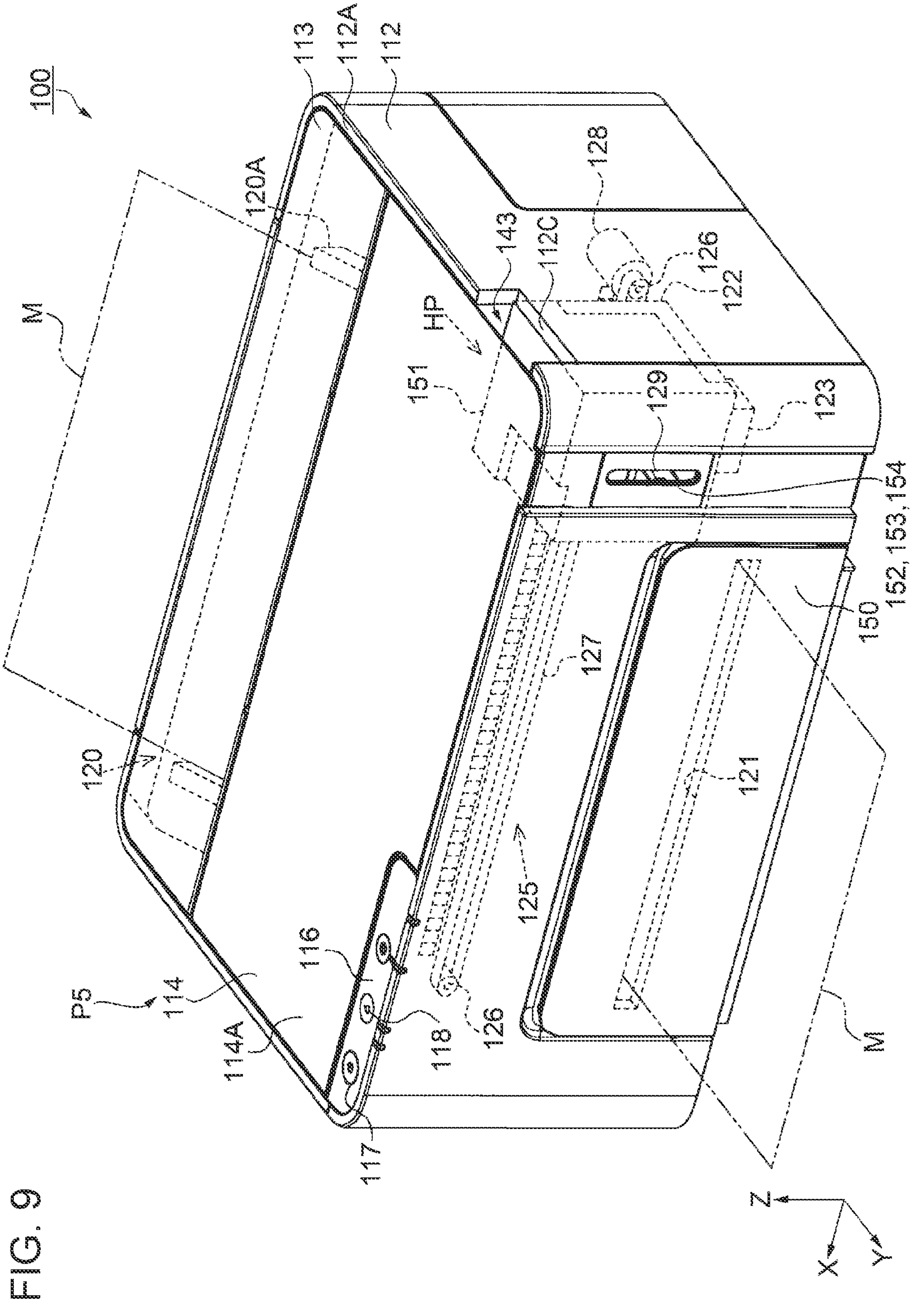
FIG. 9 is a perspective view of a printer according to a second embodiment of the present disclosure.
Figure 10:
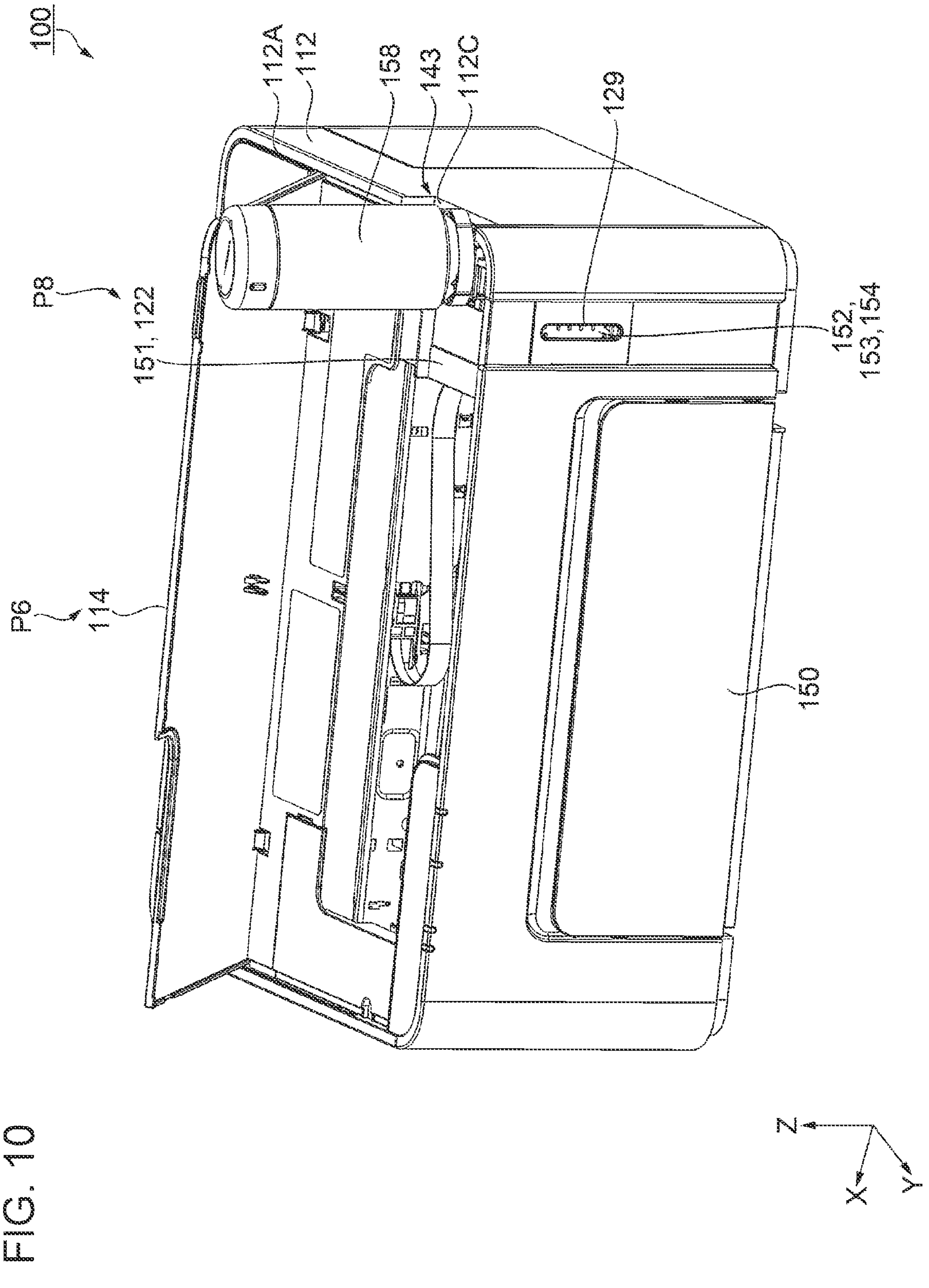
FIG. 10 is another perspective view of the printer according to the second embodiment.

FIG. 9 is a perspective view of a printer 100 according to a second embodiment. FIG. 10 is another perspective view of the printer 100 according to this embodiment. FIG. 9 illustrates a state in which a maintenance cover 114 is closed so as to be disposed at a closed position P5 at which an ink tank 152 is covered. FIG. 10 illustrates a state in which the maintenance cover 114 is opened so as to be disposed at an open position P6 at which ink can be poured from a refill container 158 into the ink tank 152. The printer 100 is an example of the liquid ejecting apparatus in this application. The maintenance cover 114 is an example of the opening and closing member in this application. The closed position P5 is an example of the closed position at which the liquid container is covered in this application. The open position P6 is an example of the open position at which liquid can be poured from the refill container into the liquid container in this application. The ink tank 152 is an example of the liquid container in this application.

The printer 2 according to the first embodiment is a so-called off-carriage printer in which the ink tanks 51 are disposed outside the carriage 18. The printer 100 according to this embodiment is a so-called on-carriage printer in which the ink tank 152 is mounted on a carriage 122. The printer 2 according to the first embodiment is a full-color printer in which inks of four colors (black ink, cyan ink, magenta ink, and yellow ink) are contained. The printer 100 according to this embodiment is a monochrome printer in which ink of one color (black ink) is contained. These are the main differences between the printer 100 according to this embodiment and the printer 2 according to the first embodiment.

Referring to FIGS. 9 and 10, the printer 100 according to this embodiment will be described in outline with a focus on the differences from the printer 2 according to the first embodiment. The printer 100 according to this embodiment is a monochrome printer in which ink of one color (black ink) is contained but may be a full-color printer in which inks of four colors are contained. In the case where the printer 2 according to the first embodiment or the printer 100 according to this embodiment contains inks of multiple colors, the number of colors of the inks is not limited to four and may be greater or less than four.

As shown in FIG. 9, the printer 100 includes a substantially rectangular parallelepiped casing 112. On the top of the casing 112, an operation panel 116 is provided. The operation panel 116 is provided with a plurality of operation buttons including a power button 117 and an ink pour button 118. The casing 112 has an upper surface 112A disposed in the +Z direction. The casing 112 is an example of the outer case in this application, an example of the upper case member in this application, and an example of the side case member in this application. The upper surface 112A of the casing 112 is an example of the surface of the upper case member in this application.

In this embodiment, the upper case member in this application and the side case member in this application are made of the same member (the casing 112). In contrast, in first embodiment, the upper case member in this application and the side case member in this application are made of different members (the upper case member 41 and the side case member 42). This is another difference between this embodiment and the first embodiment.

The printer 100 includes, in the +Z direction, a feed cover 113 positioned at the rear (−Y direction) and the maintenance cover 114 positioned at the front (+Y direction) openably and closably. The surface of the maintenance cover 114 in the +Z direction is an upper surface 114A. The feed cover 113 and the maintenance cover 114 are mounted to the casing 112 and are rotatable with respect to the casing 112. The upper surface 114A of the maintenance cover 114 is an example of the surface of the opening and closing member in this application.

The maintenance cover 114 is rotatable between the open position P6 at which ink can be poured from the refill container 158 into the ink tank 152 (see FIG. 10) and the closed position P5 at which the ink tank 152 is covered. At the closed position P5 at which the maintenance cover 114 covers the ink tank 152, the upper surface 114A of the maintenance cover 114 is flush with the upper surface 112A of the casing 112. Specifically, the position of the upper surface 114A of the maintenance cover 114 in the Z direction and the position of the upper surface 112A of the casing 112 in the Z direction are the same, and the upper surface 114A of the maintenance cover 114 and the upper surface 112A of the casing 112 are disposed in the same plane (X-Y plane). This configuration forms no unnecessary protrusions and depressions of the printer 100 in the +Z direction, decreasing the dimension of the printer 100 in the Z direction to decrease the height of the printer 100 as compared with a case in which the printer 100 has unnecessary protrusions and depressions in the +Z direction, thereby making the printer 100 compact.

The feed cover 113 is openable/closable about an end in the +Y direction. When the feed cover 113 is opened, a feeding portion 120 in the casing 112 is exposed, and the user places the print medium M on a mount 120A of the feeding portion 120. The feeding portion 120 feeds the print media M set on the mount 120A one by one. The feeding portion may also be configured to feed the print media M contained in a cassette detachably mounted to the casing 112 one by one.

The printer 100 includes a discharge cover 150 at the front (+Y direction). The discharge cover 150 is mounted to the casing 112 and is rotatable with respect to the casing 112. When the discharge cover 150 is opened, an outlet 121 (indicated by broken lines) is exposed. During printing, the discharge cover 150 is opened, and the print media M printed in the casing 112 are discharged through the outlet 121.

The casing 112 houses a carriage 122 movable in the scanning direction X. The carriage 122 is equipped with a recording head 123, which is an example of a liquid ejecting unit configured to eject ink onto the print medium M, and a liquid container 151 (the ink tank 152) containing ink to be supplied to the recording head 123. The recording head 123 and the liquid container 151 (the ink tank 152) mounted on the carriage 122 are movable in the scanning direction X together with the carriage 122.

The recording head 123 ejects ink onto the print medium M to record an image on the print medium M. The liquid container 151 is a case in which the ink tank 152 is housed and includes an opening and closing cover (not shown) rotatable between an open position at which ink can be poured into the ink tank 152 and a closed position at which the ink tank 152 is covered. The liquid container 151 dese not have to include the opening and closing cover. The ink tank 152 is positioned above the recording head 123 and includes an inlet 153 for pouring ink from the refill container 158 and a cap 154 for sealing the inlet 153.

The printer 100 includes a moving mechanism 125 that moves the carriage 122. The moving mechanism 125 includes a guide shaft (not shown) that supports the carriage 122 so that it can move in the scanning direction X, a pair of pulleys 126 disposed at the opposite ends in the scanning direction X, an endless timing belt 127 wound around the pair of pulleys 126, and a carriage motor 128 that rotatably drives one of the pulleys 126 to rotate the timing belt 127 forward and reversely. The carriage 122 is fixed to part of the endless timing belt 127.

The casing 112 houses a transporter (not shown) that transports the print medium M. The transporter transports the print medium M fed by the feeding portion 120 in a transport direction Y crossing the scanning direction X. The transport direction Y is a direction (+Y direction) parallel to the direction in which the print medium M is transported at the position facing the recording head 123.

During not printing, the carriage 122 waits at a home position HP set at one end in the scanning direction X (an end in the −X direction). When the carriage 122 is disposed at the home position HP, the user can visually recognize the amount of ink remaining in the ink tank 152 through a window 129. Also when the carriage 122 is disposed at an ink pouring position P8 (see FIG. 10), the user can visually recognize the surface of the liquid in the ink tank 152 through the window 129. The ink pouring position P8 is a position at which the carriage 122 is disposed when ink is to be poured from the refill container 158 into the ink tank 152. In this embodiment, the ink pouring position P8 is positioned in the −X direction with respect to the home position HP.

When the amount of ink remaining in the ink tank 152 decreases, and ink is to be poured from the refill container 158 into the ink tank 152, the user opens the maintenance cover 114 and operates the ink pour button 118 to move the carriage 122 to the ink pouring position P8. When the carriage 122 is disposed at the ink pouring position P8, the refill container 158 for pouring ink into the ink tank 152 can be attached. Specifically, when the carriage 122 is disposed at the ink pouring position P8, and the opening and closing cover of the liquid container 151 and the cap 154 of the ink tank 152 are opened, the refill container 158 for pouring ink into the ink tank 152 can be attached.

FIG. 10 illustrates a state in which the refill container 158 and the ink tank 152 are coupled via the inlet 153. As shown in FIG. 10, the user disposes the carriage 122 at the ink pouring position P8, opens the opening and closing cover of the liquid container 151 and the cap 154 of the ink tank 152, and then couples the refill container 158 and the ink tank 152 to each other.

The side of the casing 112 in the +Z direction is recessed in the −Z direction near the ink tank 152 at the ink pouring position P8. The side of the casing 112 recessed in the −Z direction near the ink tank 152 at the ink pouring position P8 is a side 112C. The portion of the casing 112 recessed in the −Z direction near the ink tank 152 at the ink pouring position P8, that is, a space in the casing 112 in the +Z direction with respect to the side 112C is a cutout 143. In other words, the printer 100 according to this embodiment is configured such that the casing 112, which is an example of the side case member, has the cutout 143 near the ink tank 152, which is an example of the liquid container.

When ink is to be poured from the refill container 158 into the ink tank 152, the refill container 158 and the ink tank 152 are coupled, with an end of the refill container 158 inserted in the inlet 153 of the ink tank 152. In this embodiment, the casing 112 has the cutout 143. Therefore, even if the ink tank 152 at the ink pouring position P8 is disposed near the casing 112, the refill container 158 does not contact the casing 112 in a state in which the refill container 158 and the ink tank 152 are coupled, allowing the refill container 158 and the ink tank 152 to be properly coupled. Since the refill container 158 and the ink tank 152 are properly coupled, ink can be properly poured from the refill container 158 into the ink tank 152.

Furthermore, in this embodiment, part of the refill container 158 is disposed outside the casing 112 through the cutout 143 of the casing 112, with the refill container 158 and the ink tank 152 coupled. In other words, when ink is to be poured from the refill container 158 into the ink tank 152, part of the refill container 158 is disposed outside the casing 112 through the cutout 143. In pouring ink from the refill container 158 into the ink tank 152, the disposition of part of the refill container 158 outside the casing 112 through the cutout 143 allows the ink tank 152 to be disposed near the casing 112 as compared with a case in which the refill container 158 is disposed inside the casing 112. This decreases the interval (the dimension in the X direction) between the ink tank 152 and the casing 112 to decrease the dimension of the printer 100 in the X direction, making the printer 100 compact.

Thus, the printer 100 according to this embodiment is configured such that the casing 112 has the cutout 143. This allows the refill container 158 and the ink tank 152 to be properly coupled even if the ink tank 152 is disposed near the casing 112, allowing ink to be properly poured from the refill container 158 into the ink tank 152. In addition, disposing part of the refill container 158 outside the casing 112 through the cutout 143 allows the ink tank 152 to be disposed near the casing 112, decreasing the dimension of the printer 100 in the X direction, thereby reducing the size of the printer 100.

What is claimed is:

1. A liquid ejecting apparatus comprising:

a liquid ejecting unit that ejects liquid;

a liquid container that contains the liquid and that includes an inlet through which the liquid is poured from a refill container;

a casing that houses the liquid ejecting unit and the liquid container; and a third member positioned on an opposite side of the liquid container from the side of the casing, wherein the casing has a cutout at a side of the casing, wherein, when the liquid is to be poured from the refill container into the liquid container, part of the refill container is disposed outside the side of the casing through the cutout, and wherein the third member is recessed, at a portion where the refill container and the liquid container are coupled to each other, in a direction from a side of a casing member toward the third member.

2. The liquid ejecting apparatus according to claim 1, wherein the case includes an upper case and a lower side case, and wherein the cutout is provided in the lower side case.

3. The liquid ejecting apparatus according to claim 1, further comprising an opening and closing member that is attached to the case and that is configured to rotate between an open position at which the liquid can be poured from the refill container into the liquid container and a closed position at which the liquid container is covered.

4. The liquid ejecting apparatus according to claim 3, wherein a surface of the opening and closing member is, at the closed position, flush with a surface of an upper case.

5. The liquid ejecting apparatus according to claim 3, wherein the opening and closing member includes a first member that is disposed vertically above at the closed position and a second member crossing the first member, wherein the second member is disposed in the cutout at the closed position.

6. The liquid ejecting apparatus according to claim 3, wherein the opening and closing member includes a first member that is disposed vertically above at the closed position and a second member crossing the first member, wherein the second member is disposed in the cutout at the closed position.

7. The liquid ejecting apparatus according to claim 1, wherein the liquid container further comprises a second opening and closing member that is configured to be switched between an open position at which the inlet is opened and a closed position at which the inlet is sealed and that includes a tab, at one end, protruding vertically above, and wherein, when the second opening and closing member is at the closed position, the tab protrudes vertically above, in a plan view seen from the side of the casing, from a portion at which the cutout of the side of the casing is provided.

* * * * *